United States Patent [19]

Ibbott

[11] Patent Number: 5,328,572
[45] Date of Patent: Jul. 12, 1994

[54] DUAL SYSTEM USING THREE ELECTRODES TO TREAT FLUID

[76] Inventor: Jack K. Ibbott, 17-7, Nishiazabu 4-chome, Minato-ku, Tokyo 106, Japan

[21] Appl. No.: 657,813

[22] Filed: Feb. 20, 1991

[51] Int. Cl.$^5$ ............................ C02F 1/46; C02F 5/00
[52] U.S. Cl. .................................... 204/150; 204/130; 204/144; 204/186; 204/248; 204/302
[58] Field of Search ............... 204/144, 150, 248, 249, 204/130, 186, 302, 305

[56] References Cited

U.S. PATENT DOCUMENTS 4,902,391  2/1990  Ibbott .................................. 204/150

FOREIGN PATENT DOCUMENTS 276254  8/1927  United Kingdom .
463794  3/1937  United Kingdom .

OTHER PUBLICATIONS

Rolf Eliassen et al., "So-called Electrical and Catalytic Treatment of Water for Boilers", J. Am. Water Works Assn., Jul. 1952, pp. 576–582.
Rolf Eliassen et al., "Experimental Performance of 'Miracle' Water Conditioners", J. Am. Water Works Assn., Oct. 1958, pp. 1371–1385.
"Federal Trade Commission Decision on 'Elvis Water Conditioner' Claims", Jun. 1959, pp. 708/710.
The New Encyclopaedia Britannica, Encyclopaedia Britannica, Inc., fifthteenth edition, 1986, pp. 260–265.
B. Q. Welder et al., "Practical Performance of Water-Conditioning Gadgets", Industrial and Engineering Chemistry, vol. 46, No. 5, 1953, pp. 954–960.
G. V. James, Water Treatment, third edition, The Technical Press Ltd., London, 1966, pp. 164–167.
E. Nordell, Water Treatment For Industrial and Other Uses, second edition, Reinhold Publishing Corp., New York, 1961, pp. 268–272.
H. P. Godard, Editorial "Watch Out For Wondrous Water Treatment Witchcraft", Materials Performance, Apr. 1974, pp. 9.

*Primary Examiner*—John Niebling
*Assistant Examiner*—William T. Leader
*Attorney, Agent, or Firm*—Wenderoth, Lind & Ponack

[57] ABSTRACT

The present invention is drawn to a method and apparatus for treating electrically conductive fluid. Positive and negative electrodes of electrically conductive materials having different electrochemical potentials are spaced apart and electrically isolated from one another so that the only electroconductive connection that develops an electrochemical potential between the electrodes is established by fluid to be treated flowing between the electrodes. Such fluid is therefore ionized which will both prevent the precipitation of solids from the fluid which would tend to form a scale on the inner surface of piping through which the fluid flows, and aid in the removal of a previously formed scale. On the other hand, a third electrode is also provided so as to be electroconductively connected with the positive electrode but electrically isolated from the negative electrode. Therefore, the third electrode will release metal ions into the fluid. These ions will inhibit the release of a compound into the fluid having a principal element that is the same as that of the metal ions released by the electrode. In such a way, the fluid can also be treated to inhibit a particular compound, to which the fluid might be exposed, from dissolving into the fluid.

19 Claims, 2 Drawing Sheets

DUAL SYSTEM USING THREE ELECTRODES TO TREAT FLUID

BACKGROUND OF THE INVENTION

The present invention relates to a method and apparatus for treating electrically conductive fluid, that is fluid having some electroconductive capability. More particularly, the present invention relates to a method and apparatus which will prevent the precipitation of solids from water which would tend to form a scale on the inner surface of piping through which the water flows, which will aid in the removal of a previously formed scale, and which will inhibit a compound to which the fluid is exposed from being released into the fluid.

In fluid containment systems, the build-up of iron compounds on the inner surface of piping and on other parts of the system results in an increase in the iron content of the fluid flowing through the system because such iron compounds tend to dissolve into the fluid. Such a release of the iron compounds into the fluid results in a discoloration of the fluid, i.e. the fluid takes on the reddish-brown color of the iron oxide. In order to obtain fluid which is free from an excess of concentration of such iron compounds, e.g. iron oxide, the system must be flushed until the fluid having the excessive concentration of iron oxide flows from the system.

This particular problem is most prevalent and apparent after the system has not been used for several hours, such as when the system is initially put into use each morning after it has been shut down overnight.

Several known apparatus and methods are presently being used to prevent the formation of iron oxide and the resultant discoloration of the fluid. Some methods employ chemicals to simply convert the iron oxide into a colorless form of iron compound. Such methods may be considered ineffective in the sense that although the fluid does not become discolored, nonetheless the iron content level of the fluid remains relatively high. Other known methods and apparatus concentrate on preventing the fluid from taking on a high iron content level or on cleaning the deposited iron compound scale from within the fluid system.

The present inventor has researched and developed methods and apparatus using ionized water to remove a scale, mainly consisting of ferric oxide, which has been deposited on the inner surface of fluid piping. It has been recognized that when ionized water flows through piping having an oxide scale deposited on the inner surface thereof, the oxide scale is converted into a soft hydroxide (ferric hydroxide) which can be gradually removed.

According to one such development, U.S. Pat. No. 4,902,391 discloses a "self-generating" system for ionizing fluids with great efficiency to bring about a descaling effect causing the removal of deposited calcium, magnesium and ferric particles.

As disclosed in U.S. Pat. No. 4,902,391, two electrodes of electrically conductive materials having different electrochemical potentials, e.g. aluminum and carbon electrodes, are used to ionize the fluid in contact therewith owing to the potential of the electrodes. The system is "self-generating" in the sense that because the electrodes are electrically isolated from one another, the electroconductive connection between the electrodes is only established by the fluid to be treated which extends therebetween, thereby providing a system in which no external energy source is required and in which minimum current flow and maximum potential difference between the electrodes was expected. In the developmental research related to the method and apparatus disclosed in U.S. Pat. No. 4,902,391, it was found that reducing the electric current flow through the fluid between the electrodes and achieving a voltage only condition, or potential, provided the best performance.

FIG. 1 shows an essential part of the apparatus disclosed in U.S. Pat. No. 4,902,391. Reference numerals 1 and 2 designate positive and negative electrodes, respectively, of electrically conductive materials (e.g. carbon and aluminum) having different electrochemical potentials. The positive carbon electrode 1 and the negative aluminum electrode 2 are electrically isolated from each other so that no physical or electroconductive connection between the electrodes is established except through the fluid which flows between the electrodes in the direction shown by the arrows. As discussed above, it was found that by providing a condition of maximum voltage potential and minimum current flow, the system was effective in the removal of a scale, particularly the removal of a calcium or magnesium scale.

Such an apparatus is also effective for removing an iron compound scale; however, the action of removing such a scale is relatively slow. Using such an apparatus a period of one month to several months may be required to clean an iron compound scale out of a fluid containment system depending on the thickness of the scale. Apart from the extended period of time required to remove the scale, there is another disadvantage in that a considerable increase remains in the iron oxide particles released into the fluid as the fluid is flushed from the system. Therefore, a relatively long time is required to flush out the system each morning before a clear fluid can be obtained.

SUMMARY OF THE INVENTION

An object of the present invention is to provide a method and apparatus which will effect a slow cleaning of a particular compound from within a fluid containment system as the fluid is flowing through the system and which will at the same time inhibit the release of large amounts of such a compound into the fluid when the fluid is not flowing through the system, such as during at night.

The above object is achieved according to the present invention by the provision of a third electrode in addition to the self-generating system discussed above with respect to U.S. Pat. No. 4,902,391. The third electrode is of electrically conductive material that is electrically connected to the electrically conductive material of the positive electrode, but is electrically isolated from the electrically conductive material of the negative electrode. The electroconductive connection between the third electrode and the positive electrode allows metal ions of the electrically conductive material of the third electrode to be released into the fluid, thereby increasing the concentration of such ions in the fluid which in turn inhibits the release into the fluid of similar ions from other sources, such as a deposited scale, to which the fluid is exposed. Accordingly, when an iron third electrode is employed, iron (Fe) ions are released into the fluid which will inhibit the release of iron oxide ($Fe_2O_3$) into the fluid from an iron oxide scale which has been formed within the system.

On the other hand, the electrically isolated aluminum negative electrode and carbon positive electrode continue to ionize the fluid so as to prevent the precipitation of solids therefrom which would tend to form a scale on the inner surface of the piping, and to aid in the removal of a previously formed scale.

Therefore, in the dual system according to the present invention, the problem of the discoloration of the fluid when the system is opened after being at rest for several hours is greatly reduced or is completely obviated. At the same time, as the fluid flows from the system, the previously deposited scale including iron oxide and some amounts of calcium and magnesium is slowly removed and any further build-up of a scale is prevented.

BRIEF DESCRIPTION OF THE DRAWINGS

Further objects, features and advantages of the present invention will become apparent to those of ordinary skill in the art by reviewing the detailed description below of preferred embodiments in conjunction with the attached drawings, in which.

DETAILED DESCRIPTION OF THE PREFERRED EMBODIMENTS

Figure 1:
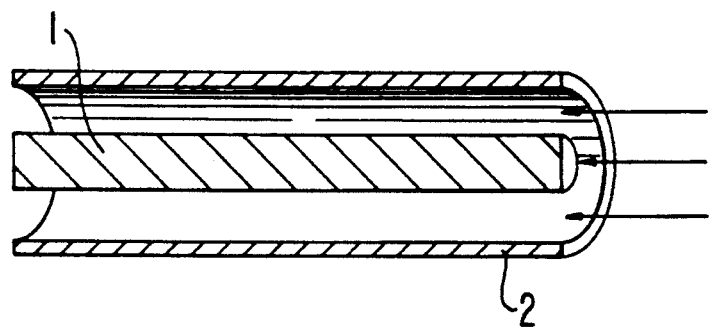
FIG. 1 is a perspective view, in section, of a basic electrode structure of apparatus for treating electrically conductive fluid, which structure is constituted by positive and negative electrodes electrically isolated from one another.
Figure 2:
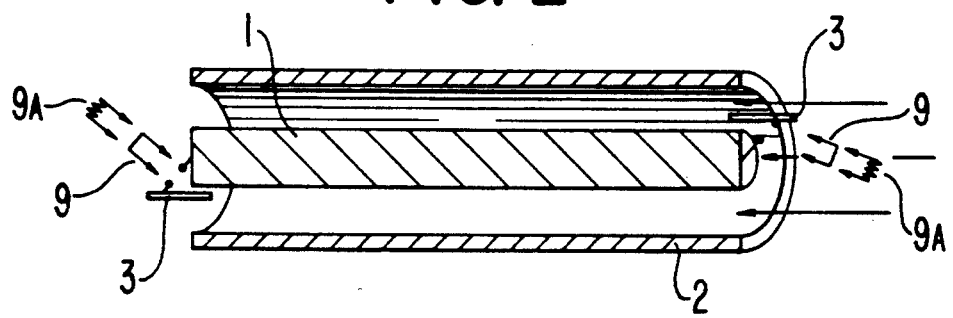
FIG. 2 is a perspective view, in section, of the essential part of one embodiment of an apparatus for treating electrically conductive fluid according to the present invention, which essential part employs the basic electrode structure of FIG. 1.

Referring first to FIGS. 1 and 2, the apparatus for treating fluid according to the present invention employs the basic electrode arrangement shown in FIG. 1, namely a positive electrode 1 of electrically conductive material, such as carbon, and a negative electrode 2 of electrically conductive material, such as aluminum. The electrically conductive materials of the electrodes 1, 2 have different electrochemical potentials such that when a body of electrically conductive fluid to be treated in the device flows in the direction of arrows between the electrodes, an electroconductive connection that develops an electroconductive potential between the electrodes is only established through the body of fluid whereby the fluid is ionized.

Referring now to FIGS. 2-5, reference numeral 3 designates a third electrode of electrically conductive material that is electrically connected to the electrically conductive material of the positive electrode 1 but is electrically isolated from the electrically conductive material of the negative electrode 2.

Figure 3:
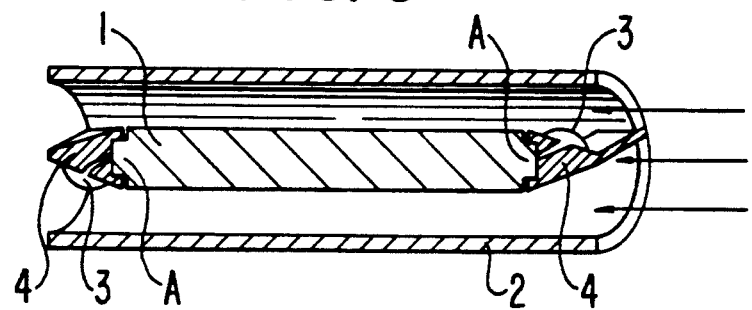
FIG. 3 is a perspective view, in section, of a practical form of the essential part of an apparatus for treating electrically conductive fluid according to the present invention.
Figure 4:
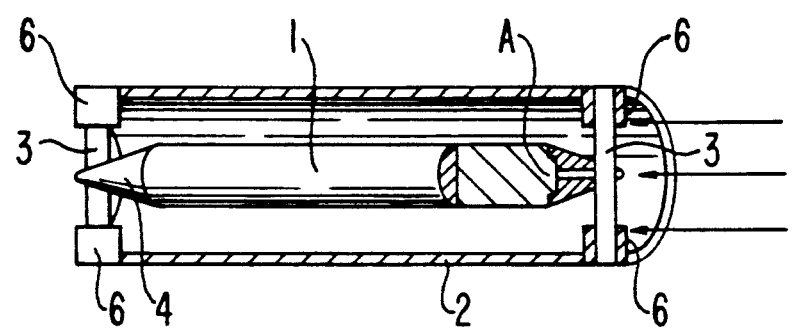
FIG. 4 is a perspective view, partly in section, of another practical form of an essential part of an apparatus for treating electrically conductive fluid according to the present invention.
Figure 5:
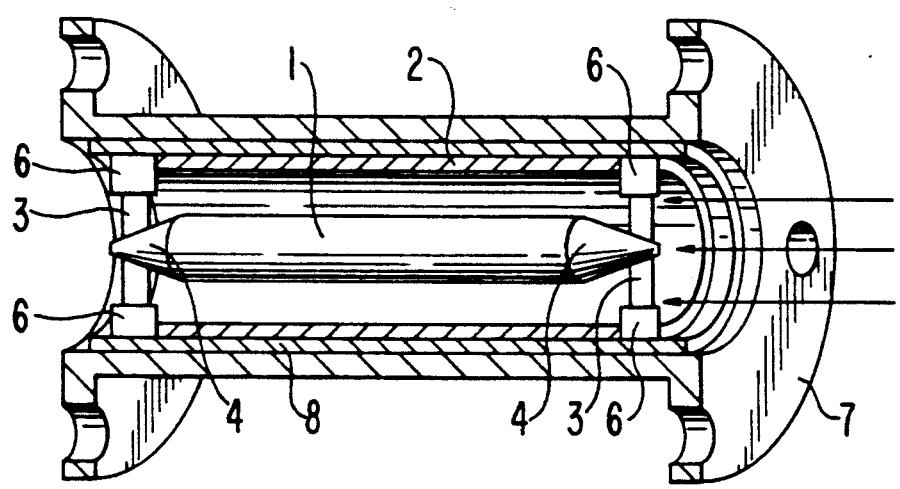
FIG. 5 is a perspective view, partly in section, of an apparatus for treating electrically conductive fluid according to the present invention, employing the essential part shown in FIG. 4.

As schematically shown in FIG. 2, the third electrode 3 may be electrically connected to the positive electrode 1 by only an electrically conductive wire 9 extending therebetween. On the other hand, a resistor 9A can be used to electrically connect the positive electrode 1 and third electrode 3 for reasons to be discussed below. Still further, as shown in FIGS. 3-5, the third electrode 3 may be disposed in direct physical contact with the positive electrode 1.

In any of the forms of construction above, three individual electrical energy conditions are established:

(1) a maximum voltage potential and minimum current condition is established between the positive electrode 1 and the negative electrode 2, (2) a maximum voltage potential and minimum current condition is also established between the third electrode 3 and negative electrode 2, and (3) a maximum current condition with minimum voltage is established between the positive electrode 1 and third electrode 3.

By electroconductively connecting the third electrode 3 and positive electrode 1, to thereby establish the condition of maximum current flow and minimum voltage potential, a large amount of metal ions of the third electrode is released into the fluid. It has been found that the introduction of such metal ions into the fluid prevents compounds of the same metal as the metal ions already in solution from readily dissolving into the fluid. Therefore, by employing a third electrode of iron (Fe), the iron oxide ($Fe_2O_3$) of a scale deposited within the fluid containment system will not dissolve into the fluid owing to the presence of the iron (Fe) ions introduced into the fluid from the third electrode. Accordingly, the discoloration of the water will be prevented at the initial opening of the system following a long period of time when the water has not been flowing through the system.

To test the effectiveness of the present invention, a device was constructed according to FIG. 2 in which a small piece of mild steel (iron) was used as the third electrode and the direct electrical connection was provided by a wire 9 between the third electrode 3 and the positive carbon electrode 1.

Two samples of tap water were tested, one having an electroconductivity of 140 $\mu$S/cm and the other having an electroconductivity of 240 $\mu$S/cm.

A piece of rusted iron was cut in half in order to provide two pieces of rusted iron which had as near as possible an equal condition of rust thereon. These two pieces were respectively placed in two glass beakers.

The first beaker was also filled with water direct from the tap having electroconductivity of 140 $\mu$S/cm. The second beaker was also filled with tap water but this tap water had first been passed through the apparatus of FIG. 2.

After the beakers had been allowed to stand for about 3 hours, the condition of the water in each beaker was examined. Whereas the untreated water in the first beaker was quickly discolored by the rust, the water treated with the present invention in the second beaker showed a noticable resistance to discoloration.

The test procedure was then repeated with the second sample of water having an electroconductivity of 240 $\mu$S/cm. After a similar standing period of 3 hours, the condition of the water in each of the beakers showed even a much greater difference between the treated and untreated water. Whereas the untreated water showed the same quick discoloration, the treated water showed little discoloration.

The above tests showed that by employing the method and apparatus of the present invention, the release of the iron rust into the water was delayed. The tests also showed that the level of electroconductive capability of the water was a factor in the effectiveness of the present invention. It should be noted that an electroconductivity level of 140 $\mu$S/cm for water is unusually low but that the electroconductivity level of 240 $\mu$S/cm is within the lower end of the range of electroconductivity levels of average water systems. Water in such systems usually ranges in electroconductive capability from 200 $\mu$S/cm up to 500 or 600 $\mu$S/cm. From this fact it should be clear that the above tests showed that the method and apparatus according to the present invention will be very efficient in treating water having an electroconductive capability within the range typical of average water supply systems.

The residual deposits on the inside surfaces of the respective beakers were also examined. After emptying the beakers of the respective samples of test water, it was observed that the beaker in which the untreated tap water had been used was discolored, and that such discoloration was extremely difficult to remove. On the other hand, the beaker accommodating the treated water had no residual discoloration or stain. These observations would indicate that the treated water prevented any deposition while at the same time preventing the discoloration of the water.

From the range of testing carried out, it became obvious that the current flow condition, i.e. that electric energy condition between the third electrode 3 and positive electrode 1 in which metal ions are released from the third electrode into the fluid, was necessary to reduce the release of iron oxide into the water. The two factors tending to influence such a current flow condition are the kind of metal ions most suitable for inhibiting the release of a particular compound into the fluid and the surface area of the electrode.

Tests to determine the most suitable metal for the third electrode were conducted with metals selected according to their electrochemical potentials. Aluminum, being the highest of the electrochemical series used, showed no appreciable effect. Zinc also showed no appreciable effect. Iron, however, provided a very positive result. In this respect, various iron alloys were tested which included stainless steel and high carbon steel; however, the more pure the iron the better the test results. Nickel and copper, which are on the other side of iron electrochemically speaking, showed no appreciable effect.

More specifically, from these tests it seems apparent that the metal of the third electrode should be closely related to (having an electrochemical potential substantially the same as) the principal element of the compound which is to be prevented from being released into the fluid. What is meant by this is that the metal of the third electrode should either be the same as or an alloy of the principal element of the compound. Therefore, in the case of iron oxide, the principal element is iron and therefore to prevent the release of iron oxide into the fluid, the third electrode should be iron or of an iron alloy. However, for other compounds the third electrode should of course be made of a metal closely related to that particular compound.

The surface area of the third electrode is a factor when the electroconductivity of the fluid which is to be treated is considered. For example, with fluid having a low electroconductive capability, the current flow between the third electrode and the positive electrode is relatively small because of the correspondingly low efficiency of the fluid as an electrolyte. Therefore, a large surface area of the third electrode would be necessary to provide the magnitude of current flow necessary to release an amount of metal ions that would be sufficient to inhibit the release into the fluid of a particular compound from another source of the compound. On the other hand, when fluid having a high degree of electroconductive capability is to be treated, the surface area of the third electrode may be made correspondingly small.

With this in mind, reference is once again made to FIG. 2 in which it has been previously disclosed that a resistor 9A may be used to connect the positive electrode 1 and third electrode 3. Because the surface area of the third electrode is a variable and controlling factor and because of the considerable variations in the level of electroconductivity of the fluid under consideration to be treated, the resistor 9A is provided as a form of control to achieve optimum operating conditions for the apparatus.

That is to say, the direct connection between the third electrode 3 and the positive carbon electrode 1 could cause an over-release of ions, e.g. iron ions, if the fluid to be treated exhibited a high degree of electroconductive capability. By employing the resistor 9A between the third electrode 3 and the positive electrode 1, although the third electrode 3 could have a relatively large area, the resistor 9A would act as a control on the amount of ions released, thereby providing extended working life for the third electrode under optimum operating conditions.

Referring now to FIGS. 3-5, the third electrode 3 can also be disposed in direct physical contact (at junction A in FIG. 3, for example) with the electrically conductive material of the positive electrode 1. It is important that the junction A at which the third electrode 3 physically contacts the positive electrode 1 be isolated from contact with the fluid. Therefore, only a portion of the third electrode 3 is exposed to contact with the fluid. If the junction at which the third electrode 3 physically contacts the positive electrode 1 is exposed to contact with the fluid, the maximum current flow at such a junction will cause a severe corrosion of the third electrode resulting in the erosion and breaking of the electroconductive connection between the third electrode 3 and positive electrode 1.

Accordingly, as shown in FIG. 3, electrical insulation in the form of a generally conical piece of plastic material 4 is disposed over at least one of the opposite axial ends of a rod-shaped positive carbon electrode 1. The third electrode 3 extends through the generally conical piece of plastic material 4 until it contacts the positive electrode 1 at junction A. The negative aluminum electrode 2 is tubular and the rod-shaped carbon electrode 1 is supported radially within the tubular negative electrode 2 by the generally conical piece of plastic material 4, whereby the tubular negative electrode 2 is electrically isolated from the electrodes 1, 3. It should be noted that the portion of the third electrode 3 which passes through the generally conical piece of plastic material 4 is tightly fitted within the plastic material 4 to prevent any leakage of the fluid to the junction A. That portion of the third electrode 3 which is exposed to the fluid may assume any desirable shape. As shown in FIG. 3, the third electrode 3 extends from a side of the generally conical piece of plastic material 4 to the base thereof, at which base the third electrode 3 physically contacts the positive carbon electrode 1 at junction A.

In the embodiment of FIG. 4, the third electrode 5 takes the form of a metal supporting bridge, wherein the third electrode 3 extends diametrically of the tubular negative electrode 2. Furthermore, pieces of electrical insulation 6 are interposed between ends of the third electrode 3 and the negative electrode 2 so as to electrically isolate the electrically conductive material of the third electrode 3 from the electrically conductive material of the negative electrode 2. The third electrode 3 and the pieces of electrical insulation 6 support the rod-shaped positive electrode 1 within the tubular negative electrode 2. The third electrode 3 passes through the generally conical piece of plastic material 4 so as to again directly physically contact the electrically conductive material of the positive rod-shaped electrode 1 at junction A. That amount of the third electrode 3 which is left exposed to the fluid may be determined by selecting an appropriate length of the pieces of electrical insulation 6 used to cover the end portions of the third electrode 3.

FIG. 5 illustrates a practical form of the apparatus for treating fluid according to the present invention, employing the essential part shown in FIG. 4. Reference numeral 7 designates a pipe having flanges thereon. These flanges can be used to connect the pipe 7 in-line with piping of a fluid system, whereby the fluid to be treated will flow over the electrodes 1, 2, 3 in the direction shown by the arrows. If the pipe 7 is metal, a layer of electrical insulation 8 is interposed between the pipe 7 and the negative electrode 2 to prevent an electroconductive connection from being established between the pipe 7 and the aluminum negative electrode 2.

Although the present invention has been fully described in connection with preferred embodiments thereof, it is to be noted that numerous changes and modifications will become apparent to those skilled in the art. Accordingly, such changes and modification, which are seen to be within the true spirit and scope of the present invention, are to be understood as encompassed by the present invention as defined by the appended claims.

What is claimed is:

1. Apparatus for treating electrically conductive fluid, said apparatus comprising:
   a positive electrode of electrically conductive material;
   a negative electrode of electrically conductive material that is spaced apart and electrically isolated from the electrically conductive material of said positive electrode,
   the electrically conductive materials of said electrodes having different electrochemical potentials such that when a body of electrically conductive fluid to be treated in the device flows between said electrodes, an electroconductive connection that develops an electroconductive potential between said electrodes is only established through the body of fluid whereby the fluid is ionized; and
   a third electrode of electrically conductive material, the electrically conductive material of said third electrode being electrically isolated from the electrically conductive material of said negative electrode, and the electrically conductive material of said third electrode being electrically connected to the electrically conductive material of said positive electrode such that when a body of fluid to be treated in the device extends between said third and said positive electrodes, metal ions of the electrically conductive material of said third electrode are released into the fluid.

2. Apparatus as claimed in claim 1, wherein said third electrode is an iron or iron alloy electrode.

3. Apparatus as claimed in claim 1, wherein only an electrically conductive wire extends between and electrically connects the electrically conductive materials of said positive and said third electrodes.

4. Apparatus as claimed in claim 1, wherein a resistor extends between and electrically connects the electrically conductive materials of said positive electrode and said third electrodes.

5. Apparatus as claimed in claim 1, wherein the electrically conductive material of said third electrode is in direct physical contact with the electrically conductive material of said positive electrode.

6. Apparatus as claimed in claim 5, and further comprising electrical insulation disposed around the junction at which the electrically conductive material of said third electrode directly physically contacts the electrically conductive material of said positive electrode.

7. Apparatus as claimed in claim 6, wherein said negative electrode is tubular, and said positive electrode is rod-shaped and extends within the tubular negative electrode.

8. Apparatus as claimed in claim 7, wherein the electrically conductive material of said third electrode directly physically contacts the rod-shaped positive electrode at at least one of opposite axial ends thereof.

9. Apparatus as claimed in claim 8, wherein said electrical insulation is a respectively generally conical piece of plastic material disposed over each said at least one of the opposite axial ends of said positive electrode, said third electrode extending through said piece of plastic material to said positive electrode.

10. Apparatus as claimed in claim 7, wherein said third electrode extends diametrically of the tubular negative electrode, and further comprising pieces of electrical insulation interposed between ends of said third electrode and said negative electrode so as to electrically isolate the electrically conductive material of said third electrode from the electrically conductive material of said negative electrode, said third electrode and said pieces of electrical insulation supporting the rod-shaped positive electrode within the tubular negative electrode.

11. Apparatus as claimed in claim 10, and further comprising a pipe having flanges thereon and in which said electrodes are disposed such that the apparatus is connectable in-line to piping of a fluid system.

12. Apparatus as claimed in claim 11, wherein said pipe is metal, and further comprising a layer of electrical insulation interposed between said pipe and said negative electrode.

13. A method of treating electrically conductive fluid in which the fluid so treated will inhibit a compound to which the fluid is exposed from dissolving into the fluid, said method comprising:
   providing a positive electrode of electrically conductive material;

providing a negative electrode of electrically conductive material that is spaced apart and electrically isolated from the electrically conductive material of said positive electrode, and which has an electrochemical potential that is different from that of the electrically conductive material of said positive electrode;

providing a third electrode of electrically conductive material having an electrochemical potential substantially the same as that of the principle element of the compound which the fluid is to be treated for, the electrically conductive material of the third electrode being electrically connected to the electrically conductive material of said positive electrode and electrically isolated from the electrically conductive material of said negative electrode; and causing a body of the fluid to flow over said electrodes so as to establish an electroconductive connection of said positive and said negative electrodes only through the body of fluid thereby causing ionization of the fluid, and so as to cause metal ions of the electrically conductive material of said third electrode to be released into the fluid thereby inhibiting the release of the compound into the fluid.

14. A method as claimed in claim 13, wherein the step of providing a third electrode comprises providing an iron or iron alloy electrode so as to inhibit the release of iron oxide into the fluid.

15. A method as claimed in claim 13, wherein the steps of providing said positive and said third electrodes comprise providing positive and third electrodes of electrically conductive materials that are electrically connected together with only an electrically conductive wire.

16. A method as claimed in claim 13, wherein the steps of providing said positive and said third electrodes comprise providing positive and third electrodes of electrically conductive materials that are electrically connected together with a resistor.

17. A method as claimed in claim 13, wherein the steps of providing said positive and said third electrodes comprise providing positive and third electrodes of electrically conductive materials that are in direct physical contact with one another.

18. A method as claimed in claim 17, wherein the steps of providing said positive and said third electrodes further comprise providing positive and third electrodes having electrical insulation disposed around the junction at which the electrically conductive material of said third electrode directly physically contacts the electrically conductive material of said positive electrode.

19. A method as claimed in claim 13, wherein the step of causing a body of the fluid to flow comprises connecting said electrodes in-line with piping of a fluid system.

* * * * *